F. NATHER.
PERCOLATOR FOR COFFEE OR TEA POTS.
APPLICATION FILED MAY 3, 1909.
946,578.
Patented Jan. 18, 1910.
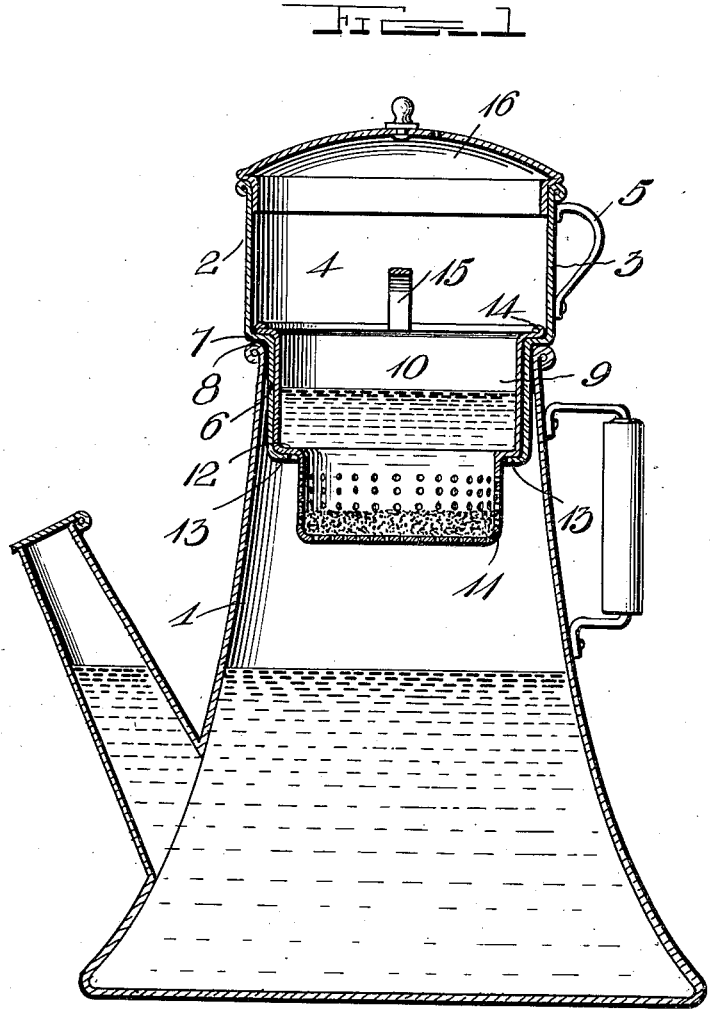
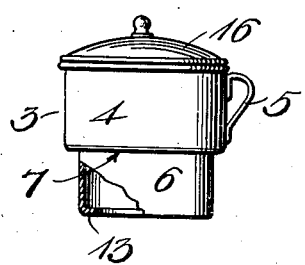
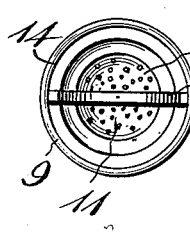
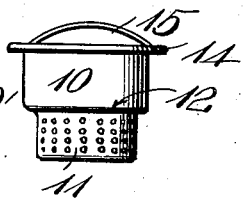
Witnesses
Inventor
Frank Nather
by H. R. Wilson & Co
Attorneys

UNITED STATES PATENT OFFICE.

FRANK NATHER, OF COLUMBUS, NEBRASKA.

PERCOLATOR FOR COFFEE OR TEA POTS.

946,578.  Specification of Letters Patent.  Patented Jan. 18, 1910.

Application filed May 3, 1909. Serial No. 493,608.

*To all whom it may concern:*

Be it known that I, FRANK NATHER, a citizen of the United States, residing at Columbus, in the county of Platte and State of Nebraska, have invented certain new and useful Improvements in Percolators for Coffee or Tea Pots; and I do declare the following to be a full, clear, and exact description of the invention, such as will enable others skilled in the art to which it appertains to make and use the same.

This invention relates to a percolator for coffee or tea pots and has for its object to provide a simple attachment of this kind which may be readily placed in or removed from position as a unitary structure and which comprises two sections including a strainer section which may be readily disengaged or separated as occasion necessitates.

With this and other objects in view, the invention consists of certain novel features of construction, combination and arrangement of parts, as will be more fully described and particularly pointed out in the appended claim.

In the accompanying drawings, Figure 1 is a side elevation of a coffee or tea pot with my percolator attachment applied thereto, parts of the pot and percolator being broken away to more advantageously illustrate certain features of the invention; Fig. 2 is a side elevation of one section of the percolator attachment removed from piston with parts broken away; Fig. 3 is a side elevation of the other section of the attachment; and Fig. 4 is a plan view of Fig. 3.

In the embodiment illustrated the numeral 1 indicates the coffee or tea pot and 2 the percolator attachment which is arranged in the upper end thereof. This attachment comprises an outer casing, 3, having an upper cylindrical body, 4, provided with a handle, 5, and a lower cylindrical portion, 6, which depends from the body and is of somewhat smaller diameter leaving an annular shoulder, 7, at the junction of the portions, 4 and 6.

In practice when the percolator attachment is arranged in position, the shoulder, 7, fits on the upper edge as 8 of the coffee or tea pot and is thereby supported in position while the lower portion, 6, extends down into the mouth of the pot. The percolator also comprises a strainer, 9, having an upper cylindrical body, 10, and a reduced perforated cylindrical straining portion, 11, which depends from the body portion, 10, leaving a shoulder, 12, at the junction of the portions, 10 and 11. The lower edge of the portion, 6, of the outer casing or section, 3, is provided with an inwardly turned annular supporting rim, 13, which provides a support or seat for the annular shoulder 12 of the strainer section, 9. The upper edge of the body, 10, of the strainer section is provided with an annular rim, 14, which fits upon the inner face of the annular shoulder, 7. A handle, 15, is secured at opposite ends in any suitable manner to the body, 10, by means of which the strainer section may be readily replaced in or removed from the outer casing or section. For example, the outer casing may remain in position permanently until it is desired to clean the pot, 1, while the strainer section may be frequently removed for cleaning and for a new supply of coffee or tea. The outer casing is provided with a cover, 16.

It is to be understood of course that the coffee or tea is placed in the straining portion, 11, of the strainer section, 9, and the hot water poured one or more times into the outer casing which provides a hopper for the water after which it passes through the coffee or tea and the perforations of the straining portion into the pot, 1.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim is:—

A percolator attachment for coffee or tea pots comprising an outer cylindrical casing having a lower depending portion which fits snugly in the mouth of the pot leaving an annular shoulder at the junction of the outer and lower portions of the casing, adapted to seat upon the upper edge of the pot, a strainer section comprising a cylindrical body adapted to fit within the lower depending portion of the outer casing and provided at its upper edge with an annular rim adapted to seat upon the inner face of the shoulder of the outer casing, said strainer section also comprising a lower, cylindrical, perforated, reduced and closed straining portion, having an annular shoulder at the junction of the body and straining portions of the strainer section, and an inwardly extending rim formed at the lower edge of the depending portion of the outer casing and forming a seat for the shoulder of the strainer section.

In testimony whereof I have hereunto set my hand in presence of two subscribing witnesses.

FRANK NATHER.

Witnesses:
 GUS G. BECHER,
 CHAS. L. DICKEY.